US006308070B1

United States Patent
Laster (10) Patent No.: US 6,308,070 B1
(45) Date of Patent: Oct. 23, 2001

(54) METHOD AND APPARATUS OF MINIMIZING INCURRED CHARGES BY THE REMOTE ORIGINATION OF TELEPHONE CALLS

(75) Inventor: Maurice Scott Laster, Atlanta, GA (US)

(73) Assignee: Selex Communications, LLC, Atlanta, GA (US)

( * ) Notice: Subject to any disclaimer, the term of this patent is extended or adjusted under 35 U.S.C. 154(b) by 0 days.

(21) Appl. No.: 09/244,715

(22) Filed: Feb. 4, 1999

Related U.S. Application Data
(60) Provisional application No. 60/100,898, filed on Sep. 23, 1998.

(51) Int. Cl.[7] .................................................. H04Q 7/20
(52) U.S. Cl. ................................................ 455/445; 455/406
(58) Field of Search ..................................... 455/445, 466, 455/414, 461, 575, 422, 432, 406, 405, 407, 408, 417

(56) References Cited

U.S. PATENT DOCUMENTS

| | | |
|---|---|---|
| 5,202,912 | 4/1993 | Breeden et al. . |
| 5,559,862 | 9/1996 | Bhagat et al. . |
| 5,659,601 | 8/1997 | Cheslog . |
| 5,734,981 | 3/1998 | Kennedy, III et al. . |
| 5,749,052 | 5/1998 | Hidem et al. . |
| 5,779,249 | 8/1998 | Kennedy, III et al. . |
| 5,787,347 | 7/1998 | Yu et al. . |
| 5,794,144 | * 8/1998 | Comer ................................. 455/426 |
| 5,806,000 | * 9/1998 | Vo ........................................ 455/466 |
| 6,018,668 | * 1/2000 | Schmidt .............................. 455/518 |
| 6,078,805 | * 6/2000 | Scott .................................... 455/406 |

* cited by examiner

Primary Examiner—Vivian Chang
Assistant Examiner—James K. Moore
(74) Attorney, Agent, or Firm—Gardner Groff Mehrman & Josephic, P.C.

(57) ABSTRACT

A method and apparatus for placing a long distance call using a mobile telephone with a data messaging device communicating via a separate data network (rather than the call signaling network) to a Remote Telephone Call Origination (RTCO) platform. The mobile telephone analyzes each number dialed to determine whether to utilize the RTCO platform or to dial normally. If RTCO is utilized, the mobile telephone transmits a data message with instructions for setting up the call. The RTCO platform then makes a call to the mobile phone and bridges this to a second call made to the dialed party.

21 Claims, 5 Drawing Sheets

METHOD AND APPARATUS OF MINIMIZING INCURRED CHARGES BY THE REMOTE ORIGINATION OF TELEPHONE CALLS

CROSS REFERENCE TO RELATED APPLICATION

The present non-provisional patent application is a continuation-in-part of U.S. Provisional Application Serial No. 60/100,898, filed on Sep. 23, 1998.

BACKGROUND OF THE INVENTION

Inbound vs. outbound telephone rates vary substantially from one market to another around the world. Indeed, some markets have extremely high outbound telephone rates in comparison to inbound rates due to the local communication companies having a monopoly in that market. As an example, outbound calls from India to the USA can cost four times as much as inbound calls from the USA to India. For several years, so-called "callback" schemes have been offered as a means to bypass the high outbound telephone rates of the various monopoly telecommunication companies around the world. Callback services have the potential of saving up to 50% or more on international long distance calls. However, known callback services have been difficult for a customer to use. This is so because the customer has had to dial extra digits, requiring more time and introducing additional opportunities for error. Because of this, callback services have met with only limited market success and even then only when outbound telephone rates from the monopoly telecommunication companies are so excessive as to justify the extra effort by the customer to use the callback service.

Known callback services work by assigning each customer a unique phone number that terminates to an international callback platform. The international callback platform is a facility located in a country (for example, in the United States) inbound to the customer's country that has substantial competition for outbound telephone rates and therefore has much lower long distance rates (often as much as 80% lower than in some locales) than the outbound rates in that country. To use the service, the customer calls his unique international phone number and then hangs up. This prompts the international callback platform to make an inbound call to the user's telephone. The user then answers the phone and gets a new (second) dial tone from the international callback platform. Using the second dial tone, the customer dials the phone number of the destination party that he wishes to reach. The international callback platform uses the new number to call the desired number and then bridges the two calls together so that the user can talk to the desired party. Effectively, an outbound call from the customer's country is replaced by two calls: an inbound call to the customer and an outbound call from a country with low outbound rates to the destination party.

To speed things up and to make the use of international callback easier, it has been known to utilize speed dialing codes for the most commonly called TO international phone numbers for a customer. Under this scheme, the customer can create short speed dialing codes for his most commonly called international phone numbers. First, the customer would call the international callback platform and create a two digit speed dialing code assigned to a desired phone number. For example, the customer might assign the code "17" to his or her parents' phone number in a different country. Once a callback session has been initiated (i.e. once the international callback platform has dialed up the customer's telephone and the customer has answered), the customer can then enter the short speed dial code to direct the international callback platform to call the assigned telephone number. The entry of the short speed dialing code directs the international callback platform to call the particular number previously created. This technique can reduce the number of digits that the customer must enter during the second stage of dialing. However, it still requires that the customer make a conscious choice to call the international callback platform and dial twice (once to call the international callback platform and once to call the number). Moreover, it requires the customer to remember the speed dialing codes and it is difficult to create, change, and delete the speed dialing codes in the international callback platform.

In another effort to improve the ease of initiating or using a callback scheme, a callback provider installs small local gateway platforms in various large cities that it serves along with a larger international callback platform in the low-cost long distance market (i.e., the U.S.). The customer is then assigned a unique local telephone number that reaches the local gateway platform. To initiate a callback, the customer calls the local telephone number and hangs up. The local gateway platform then sends a data message via a data network to the international callback platform which then calls the customer's telephone number. The customer then answers the telephone and receives a second dial tone to allow him to dial his desired party. This method reduces the number of digits that the customer must dial in the first dialing stage because he only has to dial a local number, rather than calling an international number to initiate the callback session. However, the user must still dial all of the digits in the international telephone number he desires to call. This represents only a marginal improvement over the prior techniques.

What is needed then is a method and apparatus that allows the customer to enjoy the cost-savings and benefits of a callback service without the difficult and time-consuming effort needed to initiate a callback session. It is to the provision of such a method and apparatus that the present invention is primarily directed.

SUMMARY OF THE INVENTION

Briefly described, in a first preferred form the present invention comprises a method of placing a long distance call (or other relatively high-cost call) using a mobile telephone of the type having a data messaging device included therein for communicating with a data network and using a Remote Telephone Call Origination ("RTCO") platform to avoid high charges in one locale and to incur lower charges in a second, lower-cost locale. The method comprises the steps of:

(a) capturing a relatively high-cost telephone number dialed by a user of the mobile telephone;

(b) transmitting a data message to the data network using the data message device, the data message including the dialed telephone number and identifying the mobile telephone number;

(c) relaying the message from the data network to the RTCO platform;

(d) placing a first call from the RTCO platform to the mobile telephone; and (e) placing a second call from the RTCO platform to the long distance telephone number dialed in a manner to connect the first and second calls to each other.

Preferably, the step of transmitting a data message is carried out without requiring that the user do anything more than initially dial the long distance number (in some telephones this might include also pressing a <send> key).

Also preferably, the message relayed from the data network to the RTCO platform includes the telephone number of the telephone.

Also, the method preferably includes the step of monitoring a telephone number dialed by the user to determine if the telephone number dialed is a relatively high-cost number. If the number dialed is a low-cost call, then the call is placed directly without using the callback platform. If the number dialed is a relatively high-cost telephone call the call is not placed directly but instead the call is made using the RTCO platform as described above. Normally, this criteria would be used to decide how to handle long distance calls and cellular roaming calls. Alternatively, in the case of local calls the criteria could include whether the cost of the local call is greater than long distance calls so that local calls could be placed indirectly using the RTCO platform as described above. One skilled in the art can see how this invention can be used to allow a carrier to control the long distance of their users while they are roaming in another network other than one controlled by that carrier.

In another preferred form, the invention comprises a mobile telephone for use with a telephony network, for use with an RTCO platform, and for use with a data messaging network configured to relay messages to the RTCO platform. The mobile telephone includes circuitry for connecting the mobile telephone to the telephony network and an internal data messaging capability for communicating with the data network. A user interface is provided for initiating telephone calls (such as a keypad), such as for dialing telephone numbers. Control means are provided for monitoring the telephone number dialed by the user and the control means is responsive to the dialing of a relatively high-cost number for transmitting a RTCO message from the data messaging device to the data network to initiate a RTCO call from the RTCO platform.

Preferably, the control means is operative for monitoring a telephone number dialed by the user to determine if the telephone call is relatively high-cost, such as whether the number is a local number or is a long distance number. If the number dialed is a low-cost call, then the call is placed directly and if the number dialed is a relatively high-cost call, the call is not placed directly, but instead use is made of the RTCO platform as described above.

This method and apparatus has some very distinct advantages over the known prior art. First, the invention allows the user (customer) to take advantage of differences between inbound and outbound calling rates. Also, the user gains the advantages of something like a callback scheme without ever knowing that he is utilizing something like a callback scheme. This makes the operation of the cost-saving technique completely transparent, without additional difficulty for the user, and is simple, fast, and automatic. It also implements a callback scheme in a relatively short time, with the customer not knowing that any additional time has been required to employ a callback scheme (if indeed any extra time is required). Indeed, the total time to connect with the desired telephone number should be roughly comparable to the amount of time it takes to make the call directly. Also, the user is not required to punch additional buttons or to remember any special codes in order to take advantage of the callback scheme. Thus, the customer is able to enjoy all the benefits (cost savings) of a callback scheme without any of the drawbacks normally attendant thereto.

The present invention has a distinct advantage over known callback schemes. In the present invention, the substantial cost savings is achieved by the use of a technique or scheme referred to herein as Remote Telephone Call Origination (RTCO). This differs from known callback services in that the user of RTCO doesn't need to make an initial call to a callback platform. Instead, the user simply dials the destination party normally. The user's telephone device communicates by a Data Messaging Device to an RTCO platform to originate the call in a manner that is transparent to the user. Thus, the user never has to first dial a callback platform and then call his destination number. This is much simpler, easier to use, and faster than known callback schemes.

Accordingly, it is an object of the present invention to provide a method and apparatus for a user to take advantage of differences in inbound vs. outbound telephone rates with little if any additional effort.

It is another object of the present invention to provide a method and apparatus for a carrier to control who offers long distance telephone service even when a user is not in their network.

It is another object of the present invention to provide a method and apparatus for RTCO which is fast in execution.

It is another object of the present invention to provide a method and apparatus for RTCO which can be transparent to the user of the telephone.

It is yet a further object of the present invention to provide a method and apparatus for RTCO which requires little if any additional effort or keypad strokes by the user of the telephone.

It is yet a further object of the present invention to provide a method and mobile telephone apparatus for automatically placing calls using a RTCO platform.

It is a further object of the present invention to provide a method and apparatus for RTCO which is responsive to cost criteria to minimize the cost of calls.

It is another object of the present invention to provide a method and apparatus for RTCO which does not require the use of special dialing codes.

It is yet a further object of the present invention to provide a method and apparatus for RTCO which is operative for minimizing or avoiding high long distance charges, high roaming charges, and high local charges.

These and other objects, features, and advantages of the present invention will become more apparent upon reading the following specification in conjunction with the accompanying drawing figures.

DETAILED DESCRIPTION OF THE PREFERRED EMBODIMENTS

Figure 1:
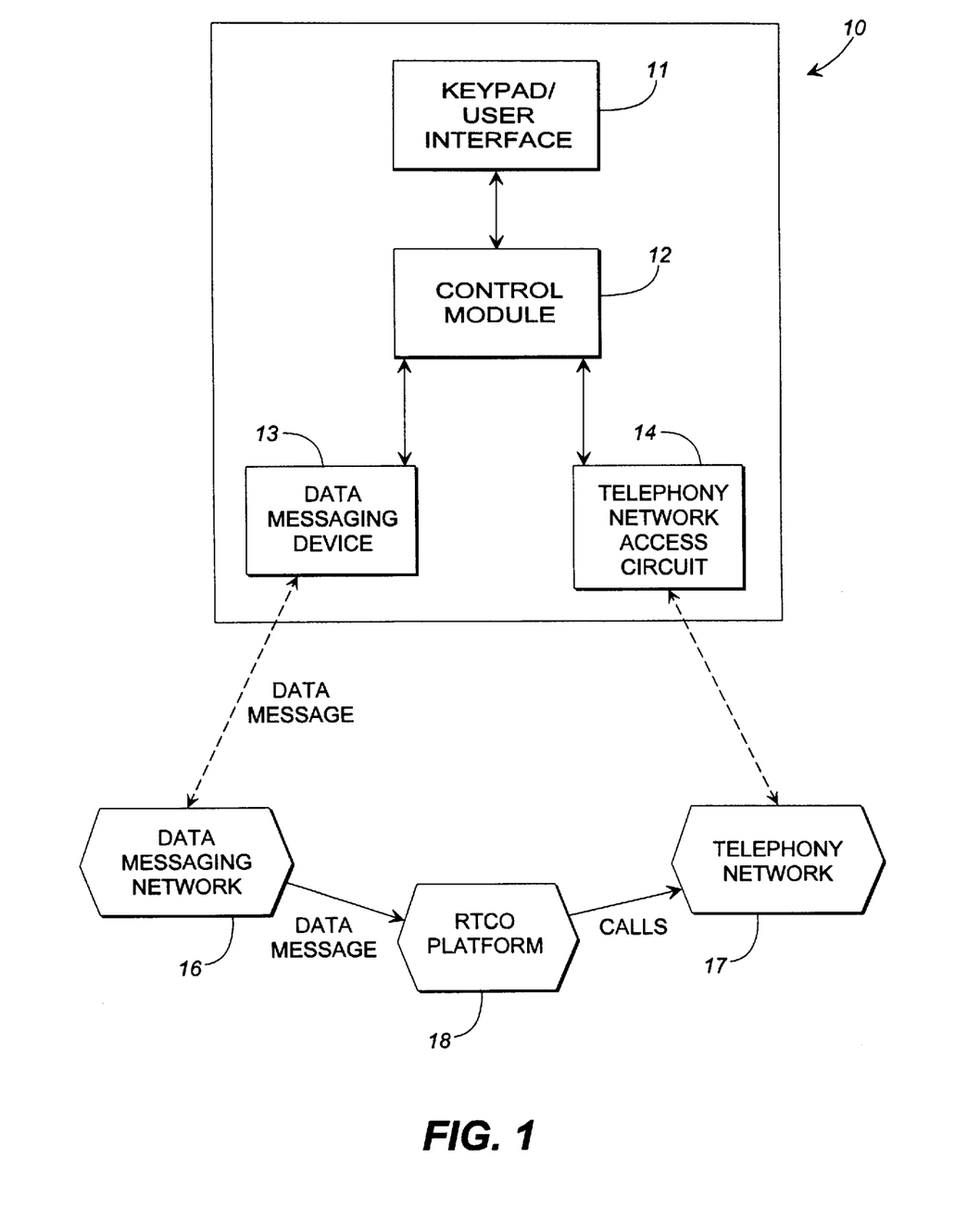
FIG. 1 is a schematic, functional depiction of a mobile telephone apparatus according to a preferred form of the invention and shown in conjunction with a data messaging network, a RTCO platform, and a telephony network.

Referring now in detail to the drawing figures, wherein like reference numerals represent like parts throughout several views, FIG. 1 schematically depicts a mobile telephone apparatus 10 according to a preferred form of the invention. The mobile telephone apparatus 10 includes a keypad and user interface 11 in communication with a control module 12. The control module 12 in turn is in communication with a data messaging device 13 and telephony network circuitry 14. Thus, the mobile telephone 10 includes an internal data messaging device 13 for communicating with an external data messaging network 16. Likewise, the telephony network circuitry 14 included within the mobile telephone 10 is operative for communicating with the telephony network 17. Furthermore, the mobile telephone 10 is intended to be used in conjunction with a Remote Telephone Call Origination ("RTCO") platform 18.

The internal data messaging device 13 is configured for sending and optionally receiving data messages to and from the data messaging network 16. The data messaging network is configured to relay certain data messages to the RTCO platform, as shown. The RTCO platform 18 is configured to, in response to certain data messages from the data messaging network, place a call to the mobile telephone through the telephony network and also to place another call to the number dialed by the mobile telephone. The RTCO platform is also configured for connecting these calls together.

In general, mobile telephones are already known of which include a keypad and user interface, a control module and a data messaging device. One example of such is a GH 688 model cellular telephone including a built-in two-way "pager-like" functionality called "Short Messaging" and is manufactured by Ericsson. However, such known prior mobile telephones are not configured and programmed to effect the RTCO scheme described herein. For example, the control module 12 forming part of the novel mobile telephone 10 is operative for deciding whether to complete a call to a dialed number directly or whether to complete the call to the dialed number indirectly using the RTCO platform. This decision-making within the control module 12 is carried out following the logic depicted generally in FIG. 2.

Figure 2:
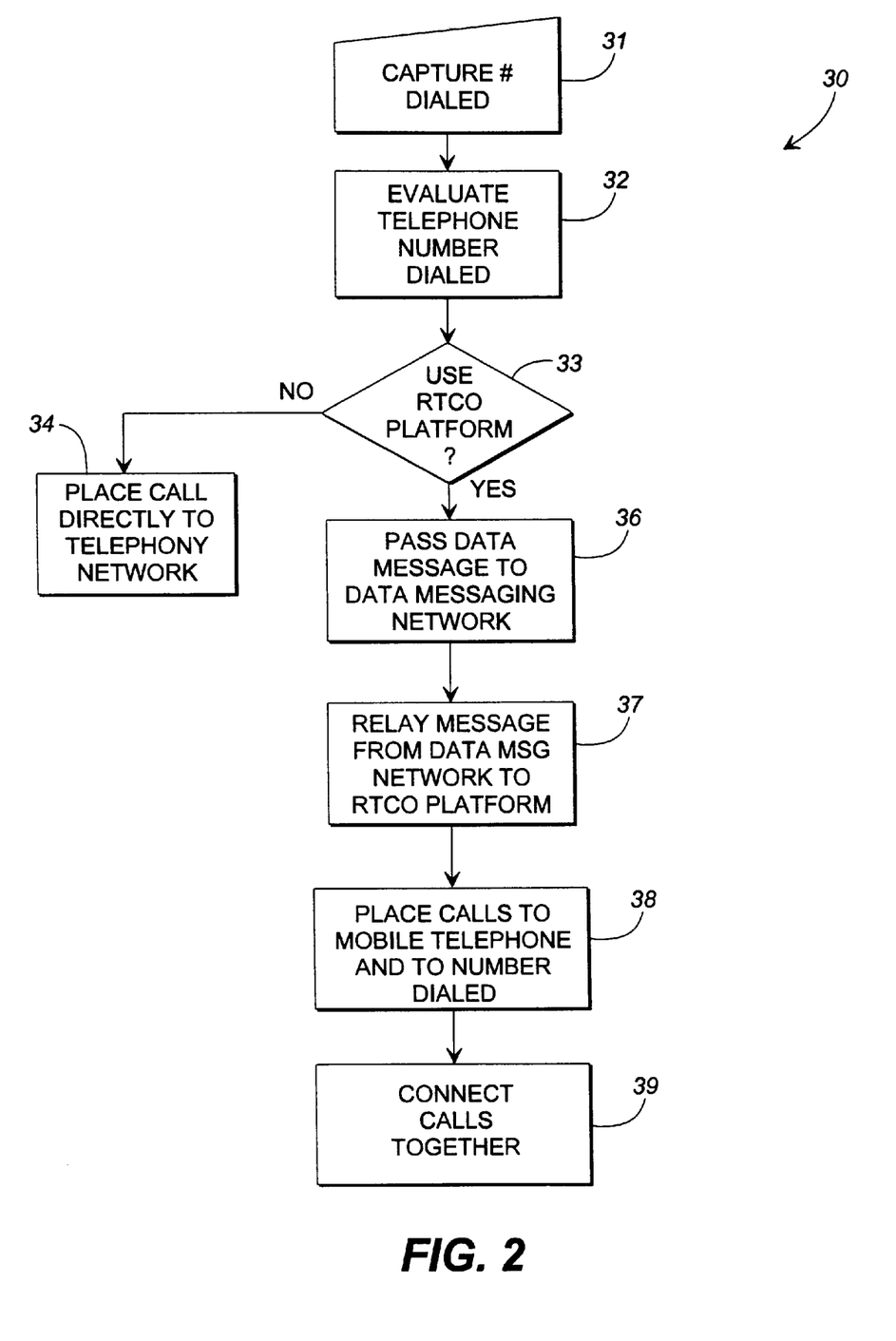
FIG. 2 is a flow chart depicting how a control module portion of the mobile telephone apparatus of FIG. 1 operates to place calls directly or to place calls indirectly using the RTCO platform.

FIG. 2 shows the operation of the control module 12 as it relates to utilizing a RTCO scheme to minimize costs of operating the mobile telephone 10. In this regard, the control module 12 executes a process indicated generally at 30. The process 30 includes an initial step 31 of capturing a telephone number dialed by the user of the mobile telephone 10. Next, in step 32 the captured telephone number is evaluated to determine if it would be better to allow the telephone number to be dialed directly or to employ an RTCO platform to dial the telephone number. This evaluation leads to a decision step 33 in which the decision is made to either use the RTCO platform or not. If the RTCO platform is not to be used, then step 34 is carried out and the call is placed directly to the telephony network. On the other hand, if the RTCO platform is to be used, then process step 36 is carried out and a data message is passed from the data messaging device 13 to the data messaging network 16. The data message contains the telephone number being dialed and the identity of the mobile telephone (and optionally additional information such as subscriber ID, equipment number, security code, network code, etc.). Next, in process step 37 the data message is relayed from the data messaging network 16 to the RTCO platform 18. Next, in process step 38 the RTCO platform 18 places a first call to the mobile telephone and then places a second call to the number dialed by the mobile telephone in a manner to connect the two phone calls to each other. This is shown by way of example in process step 39, wherein the RTCO platform 18 connects the two telephone calls together.

The mobile telephone 10 preferably is programmed to automatically answer (without the user knowing that this is taking place) the incoming telephone call from the RTCO platform. Existing known mobile telephones typically do not answer incoming calls automatically and therefore would likely require some hardware and/or software modifications to incorporate this feature. What the user of the mobile telephone perceives is that initially the user dials the telephone number desired (and typically presses a <send> key), and ultimately the call is placed to the number called. Whether this happens directly or indirectly using the RTCO platform preferably is entirely transparent and unseen by the user of the mobile telephone 10.

Figure 3:
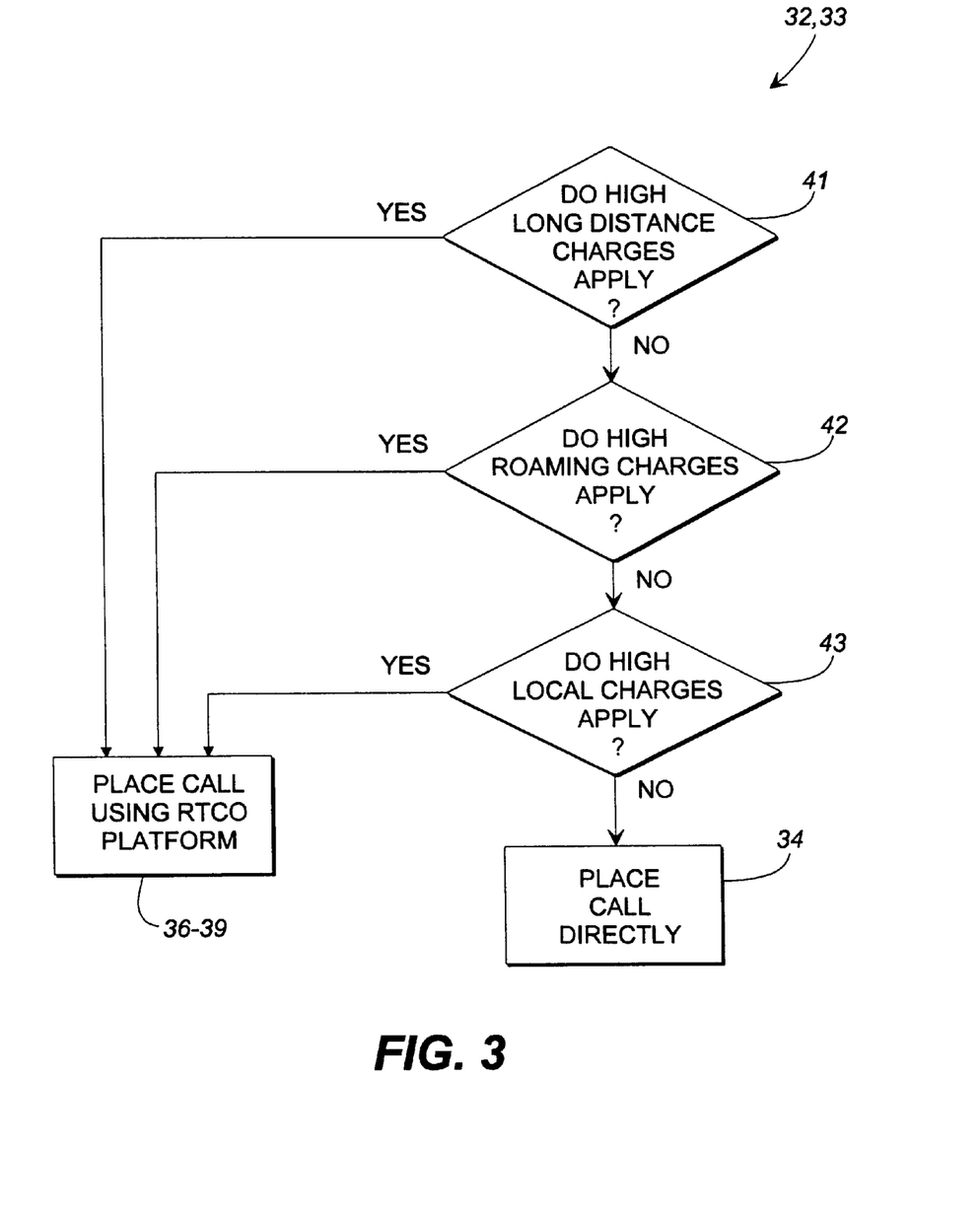
FIG. 3 is a detailed flow chart of a portion of the flow chart of FIG. 2.

Referring now to FIG. 3, one way of implementing the process steps 32 and 33 can be considered in more detail. As shown in FIG. 3, process steps 32,33 can involve a multi-tiered logic to evaluate whether it is better to allow the number dialed to be directly placed or whether to employ the RTCO platform. In the multi-tiered logic shown in FIG. 3, the first step is to evaluate, as shown in process step 41, whether the call involves high long distance charges. If high long distance charges do apply, then the call is placed using the RTCO platform, indicated generally at 36–39. Alternately, if the call does not involve high long distance charges, then next the call is evaluated to see if high cost roaming charges apply, as generally indicated in decision step 42. Again, if high cost roaming charges apply, then the call is placed using the RTCO platform according to process steps 36–39. Alternately, if high cost roaming charges are not involved, then decision process step 43 determines whether high cost local charges apply to this call (such as in Europe where the calling party always pays for the call). If the answer to this is yes, that high cost local charges will accrue, then the call can be placed using the RTCO platform according to process steps 36–39. Alternately, if high cost local charges are not involved, then the call is placed directly to the telephony network using process step 34. In this way, if a call involves high long distance charges, high roaming charges, or high cost local charges, then it can be placed using the RTCO platform. On the other hand, if it does not involve such high cost charges, then it can be placed directly. This decision making can be carried out in the context of look-up tables which are used to store logical values from which it can be deduced whether the call involves high charges.

The table shown is searched by the control software from the top to the bottom and the first entry that matches is used. If there is no entry (such as for a location area identity), then this indicates that the entry is a "don't care" entry and therefore matches any location area identity. The "–" in the initial dialed digits column indicates that any numbers will match (a "don't care" or "wild card" character situation). The ability to make routing decisions based on the location area identity is an optional feature. In the above-noted table, a "+" denotes the international dialing code in that particular country such as "011" when calling from the United States or "0011" when calling from Australia. If the mobile phone is located in a country whose network code is not in the table, then the RTCO is not available for such a call and all such calls must be made in traditional (direct) manner.

In the illustrative table, for network code 217 ("country 1"), any outgoing call to an international number (as indicated by the international dialing code) uses the RTCO. For network code 222 ("country 2"), any outgoing call that is long distance within "country 2" (indicated by a "0" before the number dialed) any international call uses the RTCO. In the above-noted example, for network code 247 ("country 3"), all outgoing calls (whether local, long-distance, or international) from the location area identity 04 use the RTCO. For all other location area identities in "country 3", only international calls use the RTCO.

| NETWORK CODE | "LAI" LOCATION AREA IDENTITY | INITIAL DIALED DIGITS |
|---|---|---|
| 217 {country 1} | — | +-------------- |
| 222 {country 2} | — | 0-------------- |
| 247 {country 3} | 04** | -------------- |
| | — | +-------------- |

As shown by the above discussion, one advantage of the look-up table approach is that it can be custom tailored to a number of different cost scenarios, to carefully avoid high telephone charges. This lookup table can be changed from time to time using data messages transmitted to the mobile telephone, such as Short Messages to a GSM phone.

Figure 4A:
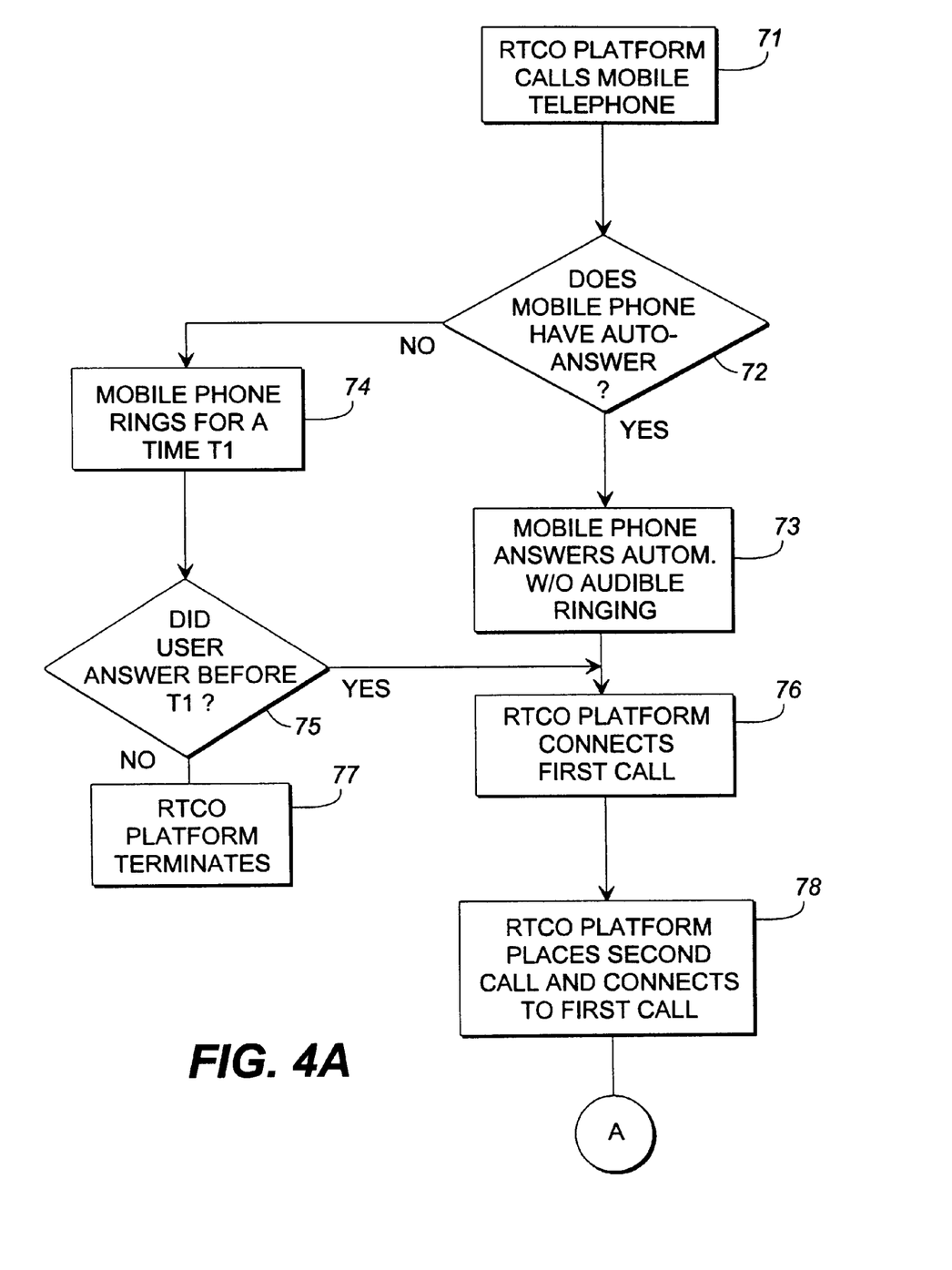
FIGS. 4A and 4B are, collectively, a detailed flow chart of a portion of the flow chart of FIG. 2.
Figure 4B:
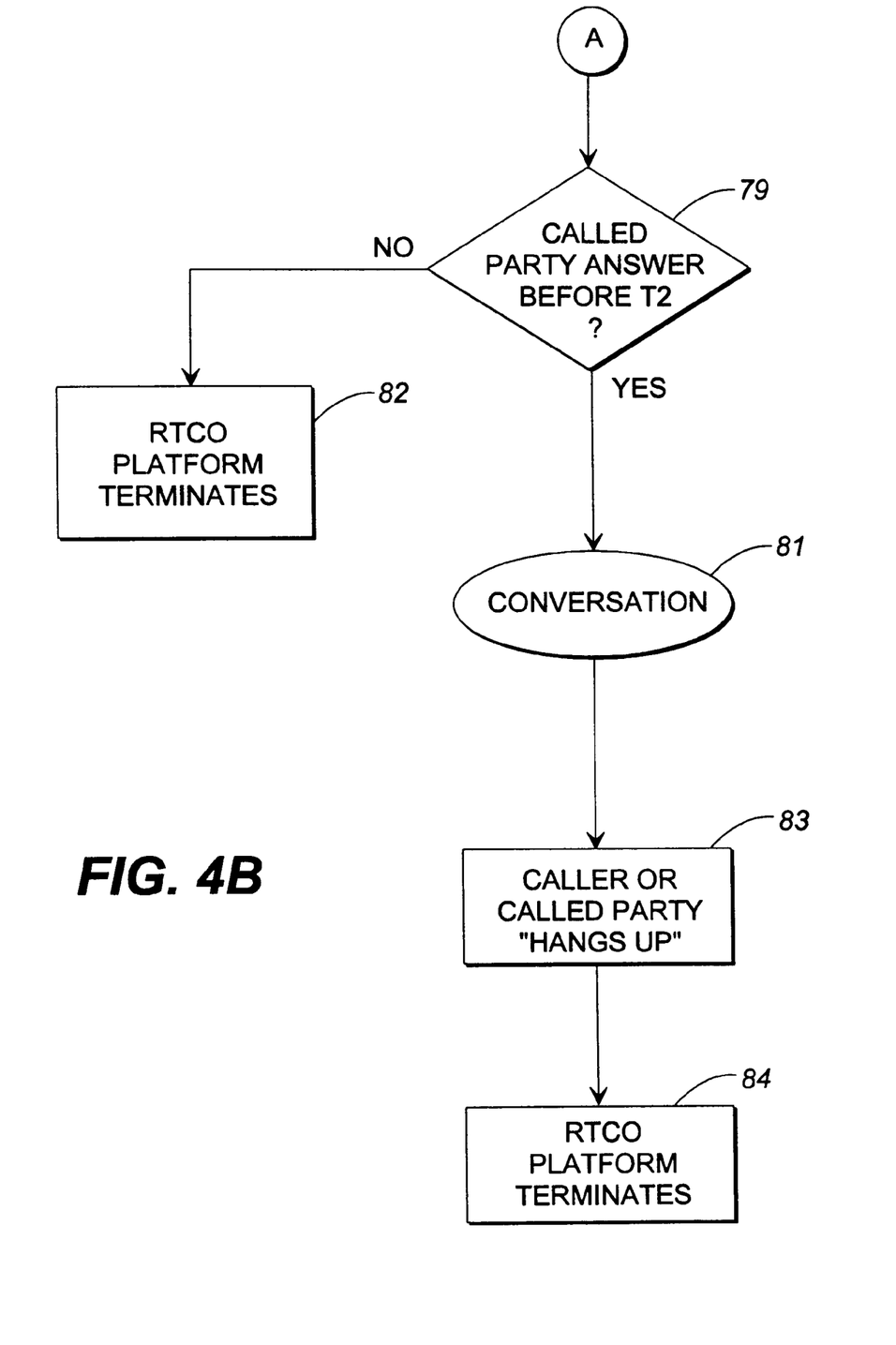

Referring now to FIGS. 4A and 4B, in the process step 38 of FIG. 2 can be considered in greater detail. As shown in FIG. 4A, the first part of process step 38 is step 71 in which the RTCO platform places a call to the mobile telephone. This is followed by decision 72 in which the process branches one way or another based on whether the mobile phone has an auto-answer capability. If the mobile phone has an auto-answer capability, then the next step is step 73 in which the mobile phone automatically answers the incoming call immediately. Alternately, if the mobile phone does not have an auto-answer capability, the mobile phone rings for a time T1 according to process step 74. If the user answers during the time T1 (see decision branch 75), then the RTCO platform connects the first call to the telephony circuitry within the platform that will be used for the second call to the number dialed according to process step 76. Otherwise, the RTCO platform terminates the call setup process by disconnecting from the first call according to process step 77.

After process step 76, the RTCO platform places the second call to the number originally dialed by the user and sets the timer T2 according to process step 78. Next, according to decision step 79, if the called party answers within a time T2 the conversation between the user and the called party takes place according to process step 81. Otherwise, the RTCO platform terminates the call setup process by disconnecting from the first and second calls according to process step 82. After the conversation terminates, the user or called party "hangs up" (disconnects from the call) according to process step 83. The RTCO platform then terminates the active call by disconnecting both the first and second calls according to process step 84.

The method and apparatus of the present invention has ready application to "dual-band" mobile phone provided by PCS1900 carriers in the U.S. to subscribers. PCS1900 carriers use the GSM digital standard in the 1900 MH$_z$ spectrum in the U.S., as versus the rest of the world which uses GSM in the 900 MH$_z$ spectrum. "Dual-band" mobile phones work for both 900 and 1900 MH$_z$ and therefore can be used in the U.S. and internationally. Using the method and apparatus of the present invention in conjunction with such dual-band mobile phones, some or all mobile-originated calls made by the U.S. subscriber while traveling internationally can be connected using the Remote Telephone Call Origination scheme with the less expensive U.S. outbound telephone rates.

As those skilled in the art can appreciate, the process of "identifying the mobile telephone" in the data message from the mobile phone can be done via special codes, a unique data address identifier, a parameter within the contents of the data message, or other means. These and other means are encompassed by the term "identifying the mobile telephone" in the claims.

The process of "dialing a telephone number" on a mobile phone can be done on some phones by dialing a phone number and pressing a <SEND> key (or some similar key) whereas in other phones the pressing of the <SEND> key is not required. Further, most mobile phones allow for the storage of telephone numbers and associated names which may be retrieved from memory and dialed by pressing the <SEND> key. These and other commonly known means of dialing a telephone number from a mobile phone are encompassed by the term "dialing a telephone number" in the claims.

As those skilled in the art can appreciate, RTCO can be used by a GSM mobile phone with the SIM card (a Subscriber Identity Module) serving as the control module and a SIM Toolkit Application comprising the software in the control module. The "Short Messaging" capability in the GSM phone can serve as the data messaging service and make use of GSM short messaging service as a data messaging network.

As those skilled in the art can also appreciate, RTCO can be used by an IS-41 mobile phone. Special programming in the mobile phone can serve as the software for the control module. The IS-41 "call origination messaging" or IS-41 "short messaging" capability in the mobile phone can serve as the data messaging device and make use of the IS-41 signaling network as data messaging network.

As those skilled in the art can further appreciate, RTCO can be used by a programmable landline phone such as a PC with software having call control over a built-in landline telephone. The call control software on the PC can serve as the control module. The IP (Internet Protocol) messaging capability within the PC can serve as the data messaging device on an IP network (e.g. 33.6 Kbps dial-up to the Internet Worldwide Web, a Wide Area Network WAN, etc.) can serve as a data messaging network.

As those skilled in the art can readily appreciate, the data messaging network can take many different forms, such as an SS7 signaling network, USSD Network, GPRS network, synchronous data network, asynchronous data network, UMTS network, etc.

It should be kept in mind that, while the invention described herein is described to operate automatically and transparently, a mobile telephone could be devised to incorporate the present invention and to include or allow control by the user. In this regard, the user could turn the use of the RTCO service on or off. This could be done through a menu option, such as is currently used to select or de-select many features and functions in cellular telephones. Also, those skilled in the art will recognize that in addition to placing a single call using the RTCO platform, the present invention can be utilized to initiate conference calls and to allow multiple calls to be placed (and toggled therebetween).

It should be understood that in the claims, the term "dialing" or to "dial" a telephone number is intended to encompass dialing a number without pressing an activation key, such as the <send> key or dialing a number and pressing an activation key, such as the <send> key.

While the invention has been disclosed in preferred forms, those skilled in the art will recognize that many modifications, additions, and deletions can be made therein without departing from the spirit and scope of the invention as set forth in the following claims.

I claim:

1. A method of placing a long distance call using a mobile telephone of the type having a data messaging device for communicating with a data network and using an RTCO platform to avoid charges in one locale and to incur charges in a second locale, the method comprising the steps of:

capturing a telephone number dialed by a user of the mobile telephone, transmitting a data message from the mobile telephone to the data network using the data messaging device of the mobile telephone without requiring that the user dial the telephone number of the RTCO platform itself, the data message including the dialed telephone number and identifying the mobile telephone;

relaying the data message from the data network to the RTCO platform;

placing a first call from the RTCO platform to the mobile telephone; and placing a second call from the RTCO platform to the number dialed in a manner to connect the first and second calls to each other.

2. A method as claimed in claim 1 wherein the first call is automatically answered by the mobile telephone.

3. A method as claimed in claim 1 wherein the message relayed from the data network to the RTCO platform includes the telephone number of the mobile telephone.

4. A method as claimed in claim 1 wherein the mobile telephone uses Short Messaging for the data network.

5. A method as claimed in claim 1 further comprising the step of comparing the telephone number dialed by the user with a look-up table to determine if the telephone number dialed should be placed directly or should instead be placed using the RTCO platform.

6. A method as claimed in claim 5 wherein the look-up table is updated from time to time using data messages transmitted to the mobile telephone.

7. A mobile telephone for use with a telephony network, for use with a RTCO platform, and for use with a data messaging network configured to relay messages to the RTCO platform, said mobile telephone comprising:

circuitry for connecting said mobile telephone to the telephony network;

an internal data messaging device for communicating with the data network;

a user input interface for initiating telephone calls, including for dialing telephone calls; and control means for monitoring a telephone number dialed by the user, for determining if a telephone call should be placed using the RTCO platform, and responsive to the dialing of certain telephone numbers for transmitting a RTCO message from the internal data messaging device to the data network to initiate an RTCO call from the RTCO platform.

8. A mobile telephone as claimed in claim 7 wherein said control means is operative to automatically answer a call from the RTCO platform.

9. A mobile telephone as claimed in claim 7 wherein said control means is operative for transmitting the RTCO message without requiring that the user do anything more than dial the telephone number.

10. A mobile telephone as claimed in claim 7 wherein said mobile telephone is adapted for Short Messaging.

11. A mobile telephone as claimed in claim 7 wherein said means for monitoring is operative for monitoring a telephone number dialed by the user to determine whether the telephone call should be placed directly or instead the call should be placed using the RTCO platform.

12. A mobile telephone as claimed in claim 7 wherein said control means is operative for comparing the telephone number dialed by the user with a look-up table to determine if the telephone number dialed should be placed directly or should instead be placed using the RTCO platform.

13. A mobile telephone as claimed in claim 12 wherein the look-up table within said control means is updated from time to time using data messages transmitted to the mobile telephone.

14. In a mobile telephone of the type for use with a telephony network and having an internal data messaging device and a keypad for dialing a telephone number, the improvement therein comprising that control means are provided for monitoring the dialing of a telephone number by a user of the mobile telephone, and for determining if telephone call should be placed using an RTCO platform, and further that the internal data messaging device is operative for communicating a message to a data messaging network for relaying the message to the RTCO platform to complete the call using the RTCO platform without requiring that the user dial any additional numbers.

15. The improvement of claim 14 wherein said control means is operative to automatically answer a call from the RTCO platform.

16. The improvement of claim 14 wherein said control means is operative for transmitting the RTCO message without requiring that the user do anything more than dial the telephone number.

17. The improvement of claim 14 wherein said mobile telephone is adapted for Short Messaging.

18. The improvement of claim 14 wherein said means for monitoring is operative for monitoring a telephone number dialed by the user to determine whether the telephone call should be placed directly or instead the call should be placed using the RTCO platform.

19. The improvement of claim 14 wherein said control means is operative for comparing the telephone number dialed by the user with a look-up table to determine if the telephone number dialed should be placed directly or should instead be placed using the RTCO platform.

20. The improvement of claim 19 wherein the look-up table within said control means is updated from time to time using data messages transmitted to the mobile telephone.

21. In a mobile telephone of the type for use with a telephony network and having internal data messaging device and a keypad for dialing a telephone number, the improvement therein comprising that control means are provided for monitoring the dialing of a telephone number by a user of the mobile telephone and further that the internal data messaging device is operative for communicating a message to a data messaging network for relaying the message to an RTCO platform to complete the call using the RTCO platform without requiring that the user dial any additional numbers, the control means being operative for determining whether to place the call directly on to place the call using the RTCO based on the relative costs of each.

* * * * *

EX PARTE REEXAMINATION CERTIFICATE (8334th)

United States Patent
Laster (10) Number: US 6,308,070 C1
(45) Certificate Issued: Jun. 21, 2011

(54) METHOD AND APPARATUS OF MINIMIZING INCURRED CHARGES BY THE REMOTE ORIGINATION OF TELEPHONE CALLS

(75) Inventor: Maurice Scott Laster, Atlanta, GA (US)

(73) Assignee: Selex Communications, LLC, Atlanta, GA (US)

Reexamination Request:
No. 90/010,795, Dec. 22, 2009

Reexamination Certificate for:
Patent No.: 6,308,070
Issued: Oct. 23, 2001
Appl. No.: 09/244,715
Filed: Feb. 4, 1999

Related U.S. Application Data (60) Provisional application No. 60/100,898, filed on Sep. 23, 1998.

(51) Int. Cl.
*H04M 3/42* (2006.01)
*H04Q 7/38* (2006.01)

(52) U.S. Cl. .................................. 455/445; 455/406
(58) Field of Classification Search .................. None
See application file for complete search history.

(56) References Cited

U.S. PATENT DOCUMENTS

| | | |
|---|---|---|
| 4,160,129 A | 7/1979 | Peyser et al. |
| 5,027,387 A | 6/1991 | Moll |
| 5,335,266 A | 8/1994 | Richardson, Jr. et al. |
| 5,353,328 A | 10/1994 | Jokimies |
| 5,581,607 A | 12/1996 | Richardson, Jr. et al. |
| 5,793,762 A | 8/1998 | Penners et al. |
| 5,987,112 A | 11/1999 | Chakravarti et al. |
| 6,026,087 A | 2/2000 | Mirashrafi et al. |
| 6,188,683 B1 | 2/2001 | Lang et al. |
| 6,324,269 B1 | 11/2001 | Malik |
| 6,377,576 B1 | 4/2002 | Zwick et al. |
| 6,421,438 B1 | 7/2002 | Denton et al. |
| 6,430,282 B1 | 8/2002 | Bannister et al. |
| 6,603,973 B1 | 8/2003 | Foladare et al. |
| 6,778,652 B2 | 8/2004 | Gaus et al. |
| 6,798,771 B1 | 9/2004 | Low et al. |
| 6,804,225 B1 | 10/2004 | Lang |
| 6,853,636 B1 | 2/2005 | Merchant |
| 6,937,593 B1 | 8/2005 | Gunasekar et al. |
| 2001/0012357 A1 | 8/2001 | Mirashrafi et al. |

FOREIGN PATENT DOCUMENTS

WO WO 97/29609 A2 8/1997

OTHER PUBLICATIONS

English language translation of WO 97/29609 and Affidavit of Translation Accuracy, performed by commercial translation company TransPerfect Translations, Inc.

*Primary Examiner* — Charles Craver (57) ABSTRACT

A method and apparatus for placing a long distance call using a mobile telephone with a data messaging device communicating via a separate data network (rather than the call signaling network) to a Remote Telephone Call Origination (RTCO) platform. The mobile telephone analyzes each number dialed to determine whether to utilize the RTCO platform or to dial normally. If RTCO is utilized, the mobile telephone transmits a data message with instructions for setting up the call. The RTCO platform then makes a call to the mobile phone and bridges this to a second call made to the dialed party.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7-11, 14-18 and 21 is confirmed.

Claims 12, 13, 19 and 20 are cancelled.

Claim 1 is determined to be patentable as amended.
Claims 2-6, dependent on an amended claim, are determined to be patentable.
New claims 22-174 are added and determined to be patentable.

1. A method of placing a long distance call using a mobile telephone of the type having a data messaging device for communicating with a data network and using an RTCO platform to avoid charges in one locale and to incur charges in a second locale, the method comprising the steps of:
   capturing, *in the mobile telephone*, a telephone number dialed by a user of the mobile telephone,
   transmitting a data message from the mobile telephone to the data network using the data messaging device of the mobile telephone without requiring that the user dial the telephone number of the RTCO platform itself, the data message including the *captured* dialed telephone number and identifying the mobile telephone;
   relaying the data message from the data network to the RTCO platform;
   placing a first call from the RTCO platform to the mobile telephone; and
   placing a second call from the RTCO platform to the number dialed in a manner to connect the first and second calls to each other.

*22. The method of claim 1, wherein the first call is a voice call.*

*23. The method of claim 1, wherein the data message comprises a subscriber identifier.*

*24. The method of claim 1, wherein the data message comprises a user identifier.*

*25. The method of claim 1, wherein the data message comprises a mobile telephone identifier.*

*26. The method of claim 1, wherein the data message comprises a network code.*

*27. The method of claim 1, wherein the data message comprises a security code.*

*28. The method of claim 1, wherein the data message comprises a data address identifier.*

*29. The method of claim 1, further comprising determining whether to transmit the data message based, at least in part, on the captured dialed telephone number.*

*30. The method of claim 1, further comprising determining whether the long distance call should be placed using RTCO platform based, at least in part, on the captured dialed telephone number.*

*31. The method of claim 1, further comprising placing a third call to a second telephone number in a manner to connect the third call to the connected first and second calls.*

*32. The method of claim 1, wherein the data message is transported, at least in part, via SS7 signaling.*

*33. The method of claim 1, wherein the data message is transported, at least in part, using Internet Protocol.*

*34. The method of claim 1, wherein capturing the telephone number dialed by the user interrupts normal connection of the call so that the transmitting, relaying and placing steps can be performed instead of directly connecting the call.*

*35. The mobile telephone of claim 7, wherein the RTCO message comprises a subscriber identifier.*

*36. The mobile telephone of claim 7, wherein the RTCO message comprises a user identifier.*

*37. The mobile telephone of claim 7, wherein the RTCO message comprises a mobile telephone identifier.*

*38. The mobile telephone of claim 7, wherein the RTCO message comprises a network code.*

*39. The mobile telephone of claim 7, wherein the RTCO message comprises a security code.*

*40. The mobile telephone of claim 7, wherein the RTCO message comprises a data address identifier.*

*41. The mobile telephone of claim 7, wherein the mobile telephone receives the telephone call from the RTCO platform.*

*42. The mobile telephone of claim 7, wherein the control means determines if the telephone call should be placed using the RTCO platform responsive, at least in part, to monitoring the telephone number dialed by the user.*

*43. The mobile telephone of claim 7 wherein the RTCO call initiated by the RTCO platform is from the RTCO platform to the telephone number dialed by the user.*

*44. The mobile telephone of claim 7 wherein the RTCO call initialed by the RTCO platform is from the RTCO platform to the mobile telephone.*

*45. The mobile telephone of claim 7 wherein the RTCO call initialed by the RTCO platform is from the RTCO platform to a telephone number of the user.*

*46. The mobile telephone of claim 7, wherein the mobile telephone is automatically connected with the RTCO platform transparently to the user.*

*47. The mobile telephone of claim 7, wherein the control means is operative, responsive to the dialing of certain other telephone numbers, to not initiate the RTCO message for transmission from the internal data messaging device to the data network.*

*48. The mobile telephone of claim 7, wherein determining if the telephone call should be placed using the RTCO platform is based on at least one criteria.*

*49. The mobile telephone of claim 48, wherein the at least one criteria comprises whether the telephone call placed from the mobile telephone to the telephone number is an international call.*

*50. The mobile telephone of claim 48, wherein the at least one criteria comprises whether the mobile telephone is roaming.*

*51. The mobile telephone of claim 48, wherein the at least one criteria comprises whether the telephone number is a high cost number.*

*52. The mobile telephone of claim 7, wherein determining if the telephone call should be placed using the RTCO platform comprises determining that no telephone calls should be placed using the RTCO platform.*

*53. The mobile telephone of claim 7, wherein determining if the telephone call should be placed using the RTCO plat-*

*form comprises determining that a subset of telephone calls should be placed using the RTCO platform.*

*54. The mobile telephone of claim 7, wherein said control means is operative to connect a first call between the RTCO platform and the mobile telephone, wherein the RTCO platform connects the first call to:*

*the telephone call between the RTCO platform and the telephone number, and*

*a second call between the RTCO platform and a second telephone number.*

*55. The mobile telephone of claim 7, wherein the RTCO message is transported, at least in part, via SS7 signaling.*

*56. The mobile telephone of claim 7, wherein the RTCO message is transported, at least in part, using Internet Protocol.*

*57. The mobile telephone of claim 7, wherein monitoring the telephone number dialed by the user comprises capturing the telephone number dialed by the user, and wherein capturing the telephone number dialed by the user interrupts normal connection of the telephone call so that the control means can first determine if the telephone call should be placed directly or should instead be placed using the RTCO platform.*

*58. The improvement of claim 14, wherein the data message comprises a subscriber identifier.*

*59. The improvement of claim 14, wherein the message comprises a user identifier.*

*60. The improvement of claim 14, wherein the message comprises a mobile telephone identifier.*

*61. The improvement of claim 14, wherein the message comprises a network code.*

*62. The improvement of claim 14, wherein the message comprises a security code.*

*63. The improvement of claim 14, wherein the message comprises a data address identifier.*

*64. The improvement of claim 14, wherein the mobile telephone receives the telephone call from the RTCO platform.*

*65. The improvement of claim 14, wherein the control means determines if the telephone call should be placed using the RTCO platform responsive, at least in part, to monitoring the dialing of the telephone number by the user of the mobile telephone.*

*66. The improvement of claim 14, wherein the telephone call is placed from the RTCO platform to the telephone number dialed by the user.*

*67. The improvement of claim 14, wherein the telephone call is placed from the RTCO platform to the mobile telephone.*

*68. The improvement of claim 14, wherein the call is completed by the RTCO platform connecting the telephone call to a telephone number of the user.*

*69. The improvement of claim 14, wherein the mobile telephone is automatically connected with the RTCO platform transparently to the user.*

*70. The improvement of claim 14, wherein the determining if the telephone call should be placed using the RTCO platform is based on at least one criteria.*

*71. The improvement of claim 70, wherein the at least one criteria comprises whether the telephone call placed from the mobile telephone number is an international call.*

*72. The improvement of claim 70, wherein the at least one criteria comprises whether the mobile telephone is roaming.*

*73. The improvement of claim 70, wherein the at least one criteria comprises whether the telephone number is a high cost number.*

*74. The improvement of claim 14, wherein determining if the telephone call should be placed using the RTCO platform comprises determining that no telephone calls should be placed using the RTCO platform.*

*75. The improvement of claim 14, wherein determining if the telephone call should be placed using the RTCO platform comprises determining that a subset of telephone calls should be placed using the RTCO platform.*

*76. The improvement of claim 14, wherein said control means is operative to connect a first call between the RTCO platform and the mobile telephone, wherein the RTCO platform connects the first call to:*

*the telephone call between the RTCO platform and the telephone number, and*

*a second call between the RTCO platform and a second telephone number.*

*77. The improvement of claim 14, wherein the RTCO message is transported, at least in part, via SS7 signaling.*

*78. The improvement of claim 14, wherein the RTCO message is transported, at least in part, using the Internet Protocol.*

*79. The improvement of claim 14, wherein monitoring the dialing of the telephone number by the user comprises capturing the telephone number dialed by the user, and wherein capturing the telephone number dialed by the user interrupts normal connection of the telephone call so that the control means can first determine if the telephone call should be placed directly or should instead be placed using the RTCO platform.*

*80. The improvement of claim 21, wherein the message comprises a subscriber identifier.*

*81. The improvement of claim 21, wherein the message comprises a user identifier.*

*82. The improvement of claim 21, wherein the message comprises a mobile telephone identifier.*

*83. The improvement of claim 21, wherein the message comprises a network code.*

*84. The improvement of claim 21, wherein the message comprises a security code.*

*85. The improvement of claim 21, wherein the message comprises a data address identifier.*

*86. The improvement of claim 21, wherein the mobile telephone receives the call from the RTCO platform.*

*87. The improvement of claim 21, wherein the control means determines whether to place the call directly or to place the call using the RTCO platform responsive, at least in part, to monitoring the dialing of the telephone number by the user of the mobile telephone.*

*88. The improvement of claim 21, wherein the call is placed from the RTCO platform to the telephone number dialed by the user.*

*89. The improvement of claim 21, wherein the call is placed from the RTCO platform to the mobile telephone.*

*90. The improvement of claim 21 wherein the control means is further operative to automatically answer a telephone call from the RTCO platform.*

*91. The improvement of claim 21, wherein the call is completed by the RTCO platform connecting the telephone call to a telephone number of the user.*

*92. The improvement of claim 21, wherein the mobile telephone is automatically connected with the RTCO platform transparently to the user.*

*93. The improvement of claim 21, wherein the control means is further operative, responsive to the dialing of certain telephone numbers, to determine whether to send a data message using the data messaging network.*

*94. The improvement of claim 21, wherein the control means is further operative to compare the telephone number dialed by the user with a look-up table to determine whether to place the call directly on to place the call using the RTCO platform.*

95. The improvement of claim 94, wherein the control means is operative, responsive to the dialing of certain telephone numbers, to not initiate the message for communication to the data messaging network.

96. The improvement of claim 94, wherein the look-up table within the control means is updated from time to time using data message transmitted to the mobile telephone.

97. The improvement of claim 21, wherein the control means is operative, responsive to the dialing of certain telephone numbers, to not initiate the message for communication to the data message network.

98. The improvement of claim 21, wherein determining whether to place the call directly or to place the call using the RTCO platform is further based on at least one criteria.

99. The improvement of claim 98, wherein the at least one criteria comprises whether the telephone call placed from the mobile telephone to the telephone number is an international call.

100. The improvement of claim 98, wherein the at least one criteria comprises whether the mobile telephone is roaming.

101. The improvement of claim 98, wherein the at least one criteria comprises whether the telephone number is a high cost number.

102. The improvement of claim 21, wherein determining whether to place the call directly or to place the call using the RTCO platform comprises determining that no telephone calls should be placed using the RTCO platform.

103. The improvement of claim 21, wherein determining whether to place the call directly or to place the call using the RTCO platform comprises determining that a subset of telephone calls should be placed using the RTCO platform.

104. The improvement of claim 21, wherein said control means is operative to connect a first call between the RTCO platform and the mobile telephone, wherein the RTCO platform connects the first call to:
    the telephone call between the RTCO platform and the telephone number, and
    a second call between the RTCO platform and a second telephone number.

105. The improvement of claim 21, wherein the RTCO message is transported at least in part, via SS7 signaling.

106. The improvement of claim 21, wherein the RTCO message is transported, at least in part, using Internet Protocol.

107. The improvement of claim 21, wherein monitoring the dialing of the telephone number by the user comprises capturing the telephone number dialed by the user, and wherein capturing the telephone number dialed by the user interrupts normal connection of the call so that the control means can first determine if the call should be placed directly or should instead be placed using the RTCO platform.

108. A method of placing a long distance call using a mobile telephone of the type having a data messaging device for communicating with a data network and using an RTCO platform to avoid charges in one locale and to incur charges in a second locale, the method comprising the steps of:
    capturing a telephone number dialed by a user of the mobile telephone, transmitting a data message from the mobile telephone to the data network using the data messaging device of the mobile telephone without requiring that the user dial the telephone number of the RTCO platform itself, the data messaging including the dialed telephone number and identifying the mobile telephone;
    relaying the data message from the data network to the RTCO platform;
    placing a first call from the RTCO platform to the mobile telephone; and
    placing a second call from the RTCO platform to the number dialed in a manner to connect the first and second calls to each other; and further comprising the step of comparing the telephone number dialed by the user with a look-up table to determine if the telephone number dialed should be placed directly or should instead be placed using the RTCO platform.

109. A method as claimed in claim 108 wherein the look-up table is updated from time to time using data messages transmitted to the mobile telephone.

110. The method of claim 108, wherein the first call is a voice call.

111. The method of claim 108, wherein the data message comprises a subscriber identifier.

112. The method of claim 108, wherein the data message comprises a user identifier.

113. The method of claim 108, wherein the data message comprises a mobile telephone identifier.

114. The method of claim 108, wherein the data message comprises a network code.

115. The method of claim 108, wherein the data message comprises a security code.

116. The method of claim 108, wherein the data message comprises a data address identifier.

117. The method of claim 108, further comprising determining whether to transmit the data message based, at least in part, on the captured dialed telephone number.

118. The method of claim 108, further comprising determining whether the long distance call should be placed using RTCO platform based, at least in part, on the captured dialed telephone number.

119. The method of claim 108, further comprising placing a third call to a second telephone number in a manner to connect the third call to the connected first and second calls.

120. The method of claim 108, wherein the data message is transported, at least in part, via SS7 signaling.

121. The method of claim 108, wherein the data message is transported, at least in part, using Internet Protocol.

122. The method of claim 108, wherein capturing the telephone number dialed by the user interrupts normal connection of the call so that the transmitting, relaying and placing steps can be performed instead of directly connecting the call.

123. A mobile telephone for use with a telephony network, for use with an RTCO platform, and for use with a data messaging network configured to relay messages to the RTCO platform, said mobile telephone comprising:
    circuitry for connecting said mobile telephone to the telephony network;
    an internal data messaging device for communicating with the data network;
    a user input interface for initialing telephone calls, including for dialing telephone calls; and
    control means for monitoring a telephone number dialed by a user, for determining if a telephone call should be placed using the RTCO platform, and responsive to the dialing of certain telephone numbers for transmitting an RTCO message from the internal data messaging device to the data network to initiate an RTCO call from the RTCO platform;
    wherein said control means is operative for comparing the telephone number dialed by the user with a look-up table to determine if the telephone number dialed should be placed directly or should instead be placed using the RTCO platform.

124. The mobile telephone of claim 123, wherein the look-up table within said control means is updated from time to time using data messages transmitted to the mobile telephone.

125. The mobile telephone of claim 123, wherein the RTCO message comprises a subscriber identifier.

126. The mobile telephone of claim 123, wherein the RTCO message comprises a user identifier.

127. The mobile telephone of claim 123, wherein the RTCO message comprises a mobile telephone identifier.

128. The mobile telephone of claim 123, wherein the RTCO message comprises a network code.

129. The mobile telephone of claim 123, wherein the RTCO message comprises a security code.

130. The mobile telephone of claim 123, wherein the RTCO message comprises a data address identifier.

131. The mobile telephone of claim 123, wherein the mobile telephone receives the telephone call from the RTCO platform.

132. The mobile telephone of claim 123, wherein the control means determines if the telephone call should be placed using the RTCO platform responsive, at least in part, to monitoring the telephone number dialed by the user.

133. The mobile telephone of claim 123 wherein the RTCO call initiated by the RTCO platform is from the RTCO platform to the telephone number dialed by the user.

134. The mobile telephone of claim 123 wherein the RTCO call initiated by the RTCO platform is from the RTCO platform to the mobile telephone.

135. The mobile telephone of claim 123 wherein the RTCO call initiated by the RTCO platform is from the RTCO platform to a telephone number of the user.

136. The mobile telephone of claim 123, wherein the mobile telephone is automatically connected with the RTCO platform transparently to the user.

137. The mobile telephone of claim 123, wherein the control means is operative, responsive to the dialing of certain telephone numbers, to not initiate the RTCO message for transmission from the internal data messaging device to the data network.

138. The mobile telephone of claim 123, wherein determining if the telephone call should be placed using the RTCO platform is based on at least one criteria.

139. The mobile telephone of claim 138, wherein the at least one criteria comprises whether the telephone call placed from the mobile telephone to the telephone number is an international call.

140. The mobile telephone of claim 138, wherein the at least one criteria comprises whether the mobile telephone is roaming.

141. The mobile telephone of claim 138, wherein the at least one criteria comprises whether the telephone number is a high cost number.

142. The mobile telephone of claim 123, wherein determining if the telephone call should be placed using the RTCO platform comprises determining that no telephone calls should be placed using the RTCO platform.

143. The mobile telephone of claim 123, wherein determining if the telephone call should be placed using the RTCO platform comprises determining that a subset of telephone calls should be placed using the RTCO platform.

144. The mobile telephone of claim 123, wherein said control means is operative to connect a first call between the RTCO platform and the mobile telephone, wherein the RTCO platform connects the first call to:

the telephone call between the RTCO platform and the telephone number, and
a second call between the RTCO platform and a second telephone number.

145. The mobile telephone of claim 123, wherein the RTCO message is transported, at least in part, via SS7 signaling.

146. The mobile telephone of claim 123, wherein the RTCO message is transported, at least in part, using Internet Protocol.

147. The mobile telephone of claim 123, wherein monitoring the telephone number dialed by the user comprises capturing the telephone number dialed by the user, and wherein capturing the telephone number dialed by the user interrupts normal connection of the telephone call so that the control means can first determine if the telephone call should be placed directly or should instead be placed using the RTCO platform.

148. In a mobile telephone of the type for use with a telephony network and having an internal data messaging device and a keypad for dialing a telephone number, the improvement therein comprising that control means are provided for monitoring the dialing of a telephone number by a user of the mobile telephone, and for determining if a telephone call should be placed using an RTCO platform, and further that the internal data messaging device is operative for communicating a message to a data messaging network for relaying the message to the RTCO platform to complete the call using the RTCO platform without requiring that the user dial any additional numbers, wherein said control means is operative for comparing the telephone number dialed by the user with a look-up table to determine if the telephone number dialed should be placed directly or should instead be placed using the RTCO platform.

149. The improvement of claim 148, wherein the look-up table within said control means is updated from time to time using data messages transmitted to the mobile telephone.

150. The improvement of claim 148, wherein the data message comprises a subscriber identifier.

151. The improvement of claim 148, wherein the message comprises a user identifier.

152. The improvement of claim 148, wherein the message comprises a mobile telephone identifier.

153. The improvement of claim 148, wherein the message comprises a network code.

154. The improvement of claim 148, wherein the message comprises a security code.

155. The improvement of claim 148, wherein the message comprises a data address identifier.

156. The improvement of claim 148, wherein the mobile telephone receives the telephone call from the RTCO platform.

157. The improvement of claim 148, wherein the control means determines if the telephone call should be placed using the RTCO platform responsive, at least in part, to monitoring the dialing of the telephone number by the user of the mobile telephone.

158. The improvement of claim 148, wherein the telephone call is placed from the RTCO platform to the telephone number dialed by the user.

159. The improvement of claim 148, wherein the telephone call is placed from the RTCO platform to the mobile telephone.

160. The improvement of claim 148, wherein the call is completed by the RTCO platform connecting the telephone call to a telephone number of the user.

161. The improvement of claim 148, wherein the mobile telephone is automatically connected with the RTCO platform transparently to the user.

162. The improvement of claim 148, wherein determining if the telephone call should be placed using the RTCO platform is based on at least one criteria.

163. The improvement of claim 162, wherein the at least one criteria comprises whether the telephone call placed from the mobile telephone to the telephone number is an international call.

164. The improvement of claim 162, wherein the at least one criteria comprises whether the mobile telephone is roaming.

165. The improvement of claim 162, wherein the at least one criteria comprises whether the telephone number is a high cost number.

166. The improvement of claim 148, wherein determining if the telephone call should be placed using the RTCO platform comprises determining that no telephone calls should be placed using the RTCO platform.

167. The improvement of claim 148, wherein determining if the telephone call should be placed using the RTCO platform comprises determining that a subset of telephone calls should be placed using the RTCO platform.

166. The improvement of claim 148, wherein said control means is operative to connect a first call between the RTCO platform and the mobile telephone, wherein the RTCO platform connects the first call to:

the telephone call between the RTCO platform and the telephone number, and a second call between the RTCO platform and a second telephone number.

169. The improvement of claim 148, wherein the RTCO message is transported, at least in part, via SS7 signaling.

170. The improvement of claim 148, wherein the RTCO message is transported, at least in part, using Internet Protocol.

171. The improvement of claim 148, wherein monitoring the dialing of the telephone number by the user comprises capturing the telephone number dialed by the user, and wherein capturing the telephone number dialed by the user interrupts normal connection of the telephone call so that the control means can first determine if the telephone call should be placed directly or should instead be placed using the RTCO platform.

172. The mobile telephone of claim 7, wherein monitoring the telephone number dialed by the user comprises capturing the telephone number dialed by the user.

173. The improvement of claim 14, wherein monitoring the dialing of the telephone number by the user of the mobile telephone comprises capturing the telephone number dialed by the user.

174. The improvement of claim 21, wherein monitoring the dialing of the telephone number by the user of the mobile telephone comprises capturing the telephone number dialed by the user.

* * * * *